(12) United States Patent
De Tarso Ferreira et al.

(10) Patent No.: US 9,153,139 B2
(45) Date of Patent: Oct. 6, 2015

(54) STEEP APPROACH PERFORMANCE IMPROVEMENTS AND OPTIMIZATION

(71) Applicant: Embraer S.A., Sao Jose dos Campos-SP (BR)

(72) Inventors: Daniel Paulo De Tarso Ferreira, Sao Jose dos Campos (BR); Mauricio Faustino Oliveira, Sao Jose dos Campos (BR); Fabricio Reis Caldeira, Sao Jose dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 0 days.

(21) Appl. No.: 14/096,777

(22) Filed: Dec. 4, 2013

(65) Prior Publication Data

US 2014/0249704 A1    Sep. 4, 2014

Related U.S. Application Data

(60) Provisional application No. 61/745,068, filed on Dec. 21, 2012.

(51) Int. Cl.
*G08G 5/02* (2006.01)
*G05D 1/06* (2006.01)

(52) U.S. Cl.
CPC .............. *G08G 5/02* (2013.01); *G05D 1/0676* (2013.01)

(58) Field of Classification Search
CPC ......... G08G 5/02; G05D 1/06; G05D 1/0607; G05D 1/0653; G05D 1/0676

USPC .......................... 701/3–6, 18; 244/99.12, 183
See application file for complete search history.

(56) References Cited

U.S. PATENT DOCUMENTS

| | | | |
|---|---|---|---|
| 3,589,648 A | 6/1971 | Gorham et al. | |
| 3,738,594 A | 6/1973 | Donovan et al. | |
| 3,774,869 A | 11/1973 | Harmon | |
| 3,850,388 A | 11/1974 | Olcott et al. | |
| 4,489,907 A | 12/1984 | Ziegelmeyer | |
| 2007/0057114 A1 | 3/2007 | Boissenin et al. | |
| 2007/0170313 A1* | 7/2007 | Delaplace | 244/183 |
| 2010/0217460 A1* | 8/2010 | Polati De Souza et al. | 701/18 |
| 2013/0138288 A1* | 5/2013 | Nickolaou et al. | 701/23 |
| 2013/0204470 A1* | 8/2013 | Luckner et al. | 701/18 |
| 2014/0291453 A1* | 10/2014 | Sankrithi et al. | 244/199.4 |

FOREIGN PATENT DOCUMENTS

| | | |
|---|---|---|
| GB | 2444742 B | 6/2008 |
| WO | 2006/016070 A1 | 2/2006 |

OTHER PUBLICATIONS

European Search Report dated Apr. 8, 2014, issued in counterpart European Patent Application No. 13 19 7402.

* cited by examiner

*Primary Examiner* — Y. Beaulieu
*Assistant Examiner* — Aaron L Troost
(74) *Attorney, Agent, or Firm* — Nixon & Vanderhye P.C.

(57) ABSTRACT

A flight control system can achieve a relatively steep descent (using drag devices such as flight spoilers) at relatively low speeds while retaining good airplane handling qualities from the pilot's point of view. The system and method optimize the drag device's positioning used to perform steep approach to improve performance.

10 Claims, 9 Drawing Sheets

STEEP APPROACH PERFORMANCE IMPROVEMENTS AND OPTIMIZATION

CROSS-REFERENCE TO RELATED APPLICATION

Benefit is claimed from U.S. Provisional Patent Application No. 61/745,068 filed Dec. 21, 2012, incorporated herein by reference.

STATEMENT REGARDING FEDERALLY SPONSORED RESEARCH OR DEVELOPMENT

None.

FIELD

The technology herein relates to control systems for aircraft, and more particularly to aircraft flight control and aircraft control law and associated automatic systems and methods. More particularly, the example non-limiting technology herein provides a flight control system which can achieve a relatively steep descent (using drag devices such as flight spoilers) at relatively low speeds while retaining good airplane handling qualities from the pilot's point of view.

BACKGROUND

If you have ever looked out of the window of a large airplane as it approaches a runway for landing, you will have seen something called a "spoiler" in operation. Spoilers are plates on the top surface of a wing that can be extended upward into the airflow to "spoil" it. See FIG. 1-1. The spoiler creates a carefully controlled stall over the portion of the wing around it, greatly reducing the lift of that wing section. As the wing's lift decreases, the aircraft will assume a trajectory angle characteristic of the approach phase up to landing.

Depending on the landing conditions and other factors, it may be necessary or desirable to provide a steeper approach angle or trajectory. FIG. 1A contrasts example non-limiting conventional and steep approach procedures for an aircraft 10. Typical conventional approaches use a trajectory angle of around −3.3 degrees. In the FIG. 1A example, the trajectory angle for a steep approach is much larger—for example, on the order of −5.5 degrees (mathematically, $0° > \Theta_{appr} > \Theta_{steep\,appr}$).

It is well known in aeronautical engineering that drag devices such as flight spoilers are capable of increasing the maximum descent ratio by increasing the trajectory angle (considering the absolute value of the trajectory angle). However, using the spoilers in this way can sometimes have drawbacks due to undesired side effects or risks.

In particular, for a given angle of attack, it is possible that as drag devices such as spoilers reduce the lift produced by the aircraft, they can also reduce significantly the margins to stall. Consequently, there is a concern regarding the speed margins that are required for safe flight operation. It is likely that speed increase will be necessary in order to regain the same stall margins as before, thus jeopardizing the performance of airplane on approaches and landings. This may result in deterioration of flying qualities during steep approaches and landings, including flare maneuvers. It could also result in exposure to high touch down sink rate and tail strike in steep approaches and landings.

Consider a steep approach operation with two possible glide slopes: a normal steep approach and an "abusive" steep approach (i.e., steeper than the normal steep approach). It is well known that aircraft have a maximum descent capability that is possible in a constant airspeed state flight. The maximum descent capability will, generally speaking, depend on the airplane's weight and on the lift, drag and engine's thrust produced by the airplane in a given flight condition.

Some operations require capability to perform a steady flight in a steeper descent path. Depending on the conditions mentioned above, a given airplane may lack this capability, especially in low airspeed conditions (e.g., those airspeed values commonly used to approach and landing). In these cases, the most commonly used solution is to introduce devices, mechanisms and methods to produce even more drag on the airplane utilizing the flight spoilers and/or other drag devices such as airbrakes, dive brakes and others, in order to allow a steeper descent trajectory.

Since there is a tradeoff between lift and drag, some attempts have been made in the past to automatically control the spoilers or other drag control surfaces, to reduce some of the above-mentioned effects. In some such prior approaches, the spoiler is biased to a predetermined position and a control feedback circuit is used to command the spoiler around the predetermined bias position. This predetermined bias position permits the aircraft to perform a steep approach landing in a predetermined flight envelope which includes different weight configurations. This bias position is typically dimensioned to cover the range of aircraft weight inside the steep approach flight envelope. In addition, spoiler bias position normally requires an increase in the approach airspeed in order to preserve or maintain sufficient margin above stall.

Heavier aircraft configurations require less drag to perform steep approach and landing than lighter configurations. If the bias position is the same for both, in the heavy weight configuration increasing the airspeed will lead to a long landing distance, frequently creating a limitation in maximum landing weight. In addition, this bias position is commonly designed to provide capability to increase the glide slope approach (beyond the Steep Approach target), allowing correction during the approach to landing. This means a higher biased spoiler position, which will also likely end up in a landing weight limitation.

To overcome these problems and provide improvements to aircraft safety, the example non-limiting technology herein adds a function that sets the biased position of the drag device(s) (spoilers, for example) depending on factors such as:

(1) the airplane estimated weight (for higher weight, the biased position will be small) so that the maximum landing weight limitation is decreased; and (2) the measured flight path angle so that during most of the approach the drag device biased position will be small but, if flight path corrections (i.e., flight path increase) is needed, the drag device will be automatically offset to a higher biased position, ensuring satisfactory descent capability without introducing a maximum landing weight limitation.

Alternatively or additionally, the example non-limiting technology herein is capable of modulating the control position of drag devices as a function of pilot longitudinal commands in order to enhance glide slope control during approach, flare and landing. Also alternatively or additionally, the example non-limiting technology herein is capable of modulating the control position of drag devices as a function of only one of the three factors mentioned above (the airplane estimated weight, measured flight path angle or pilot longitudinal command) or as a function of any combination among these three factors (which may be a combination between two or among three of them). In other words, alternatively or additionally, the example non-limiting technology herein is capable of defining a function of drag device deployment as a function of only one of the three factors among the aircraft mass, trajectory angle and pilot inceptor position and/or movement or as a function of any combination among these three factors which may be a combination between two or among three of them.

The example non-limiting technology herein also provides for automatically retracting of the drag devices, if the angle of attack reaches a predefined threshold, in order to keep unchanged stall speeds and maneuvering capability.

The example non-limiting technology herein enables a steep approach and landing with a higher airplane weight. One benefit allows operation with a higher payload (e.g., more passengers). This means that fewer airplanes are needed to carry a given payload, which in a final analysis, can reduce air traffic and consequently fuel emissions.

In addition, performing an approach and landing with a steeper approach glide slope (i.e., the kind of approach which may be achieved by an airplane equipped with the example non-limiting technology herein) results in a reduction in the noise perceived in the areas surrounding the airport. Thus, the example non-limiting technology herein contributes positively to the environment in this additional way.

In more detail, an example non-limiting system and method may optimize the drag device positioning used to perform the Steep Approach to improve its performance. One example non-limiting embodiment provides means (e.g., probes) of measuring air data, means (e.g., AHRS) of measuring aircraft inertial information, means (e.g., inceptor) of sensing pilot input, means (e.g., Fly-By-Wire or avionics system) to process data and computing outputs to command the drag devices, means (e.g., hydraulic or electromechanical actuators) of actuating the drag devices and finally the drag devices itself (e.g., spoilers).

In one example non-limiting implementation, information obtained from the air data and the inertial system is fed back to estimate the current aircraft mass. This estimation is properly filtered to avoid high frequency content not pertinent to the aircraft's mass dynamics. The Steep Approach Logic receives the estimated aircraft mass together with the current aircraft trajectory angle and the desired trajectory angle (supplied by the pilot) to compute the optimum drag device position (drag device command) which is carried out by the drag device actuators.

As the aircraft mass is reduced, the drag devices are gradually repositioned to a position which provides suitable drag to perform steep approach.

Additionally to the modulation as a function of mass, the drag devices are also repositioned based on current trajectory angle and the trajectory angle desired by the pilot. For example, when the pilot intends to perform a steeper glide slope, after keeping the aircraft in the desired trajectory angle for a certain amount (period) of time, the drag devices are automatically repositioned to a position which provides suitable drag to perform steep approach with the desired trajectory angle. The opposite works in the same way: when performing a steep approach, if the pilot intends to perform a conventional approach (e.g., glide slope around 3 degrees), the drag devices will be automatically repositioned to provide suitable drag after a certain amount of time to reduce the drag.

The repositioning of the drag devices due to variations in the estimated mass, the current trajectory angle and the desired angle is, in one example non-limiting implementation, completely transparent to the pilot. The non-limiting system may adjust itself without any additional commands by the crew.

Using all the aforementioned mentioned techniques, the example non-limiting technology herein eliminates the need for an increased approach airspeed and consequently improves the aircraft maximum landing weight.

BRIEF DESCRIPTION OF THE DRAWINGS

These and other features and advantages will be better and more completely understood by referring to the following detailed description of example non-limiting embodiments in conjunction with the drawings, of which:

FIG. 1-1 shows an example aircraft spoiler.

DETAILED DESCRIPTION OF NON-LIMITING EMBODIMENTS

Figure 1:
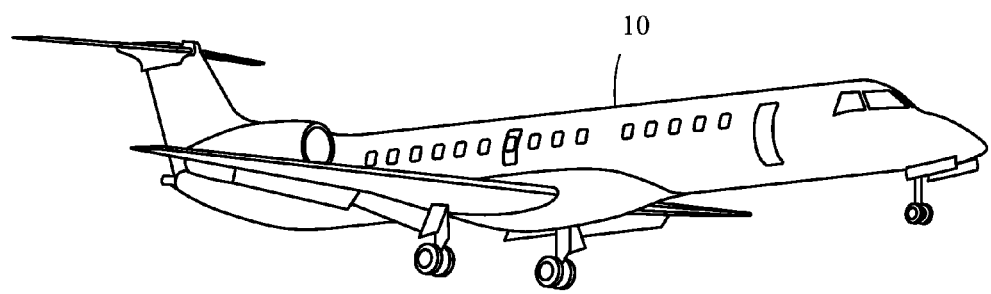
FIG. 1 shows an aircraft in a steep approach attitude.
Figure 1:
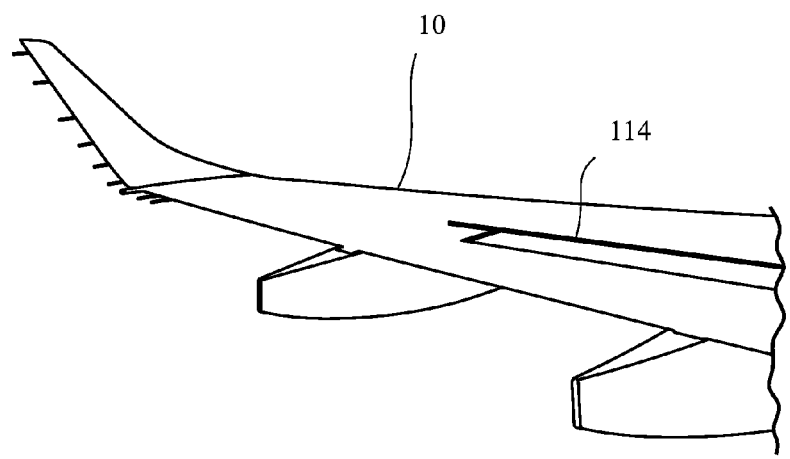
Figure 1A:
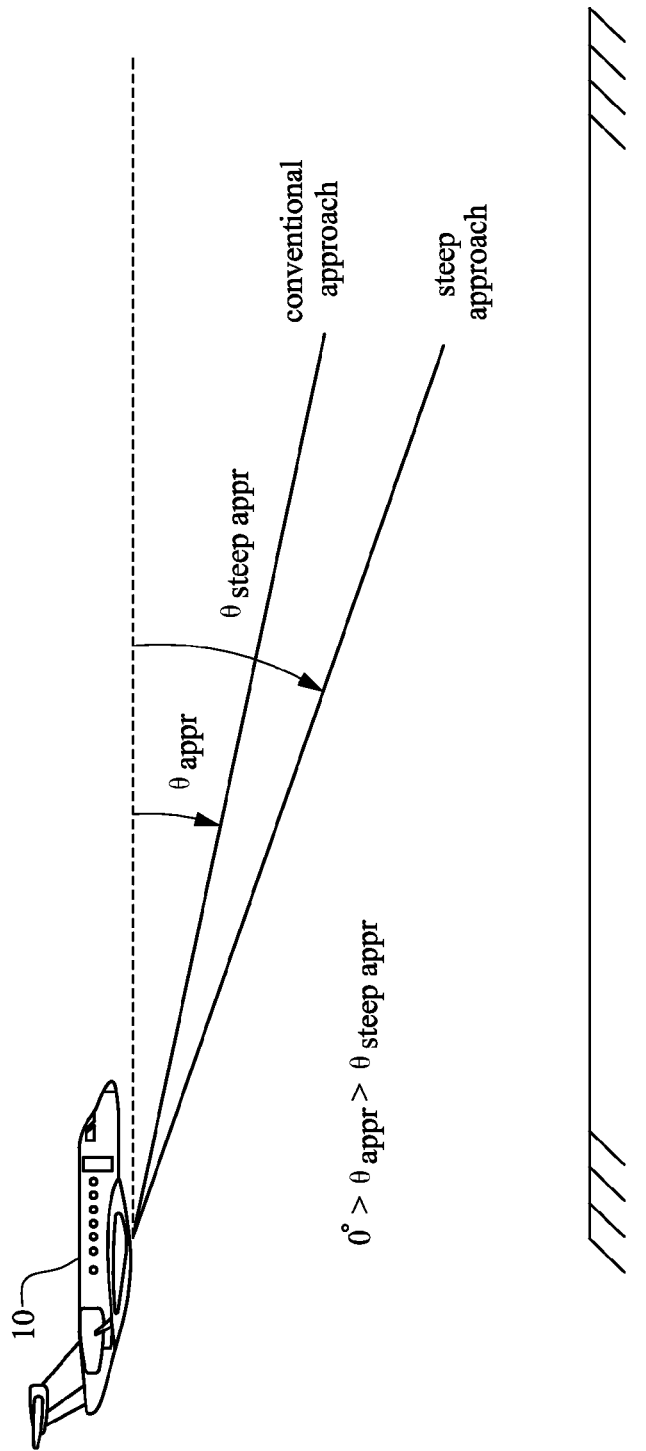
FIG. 1A shows an example steep approach procedure.
Figure 2:
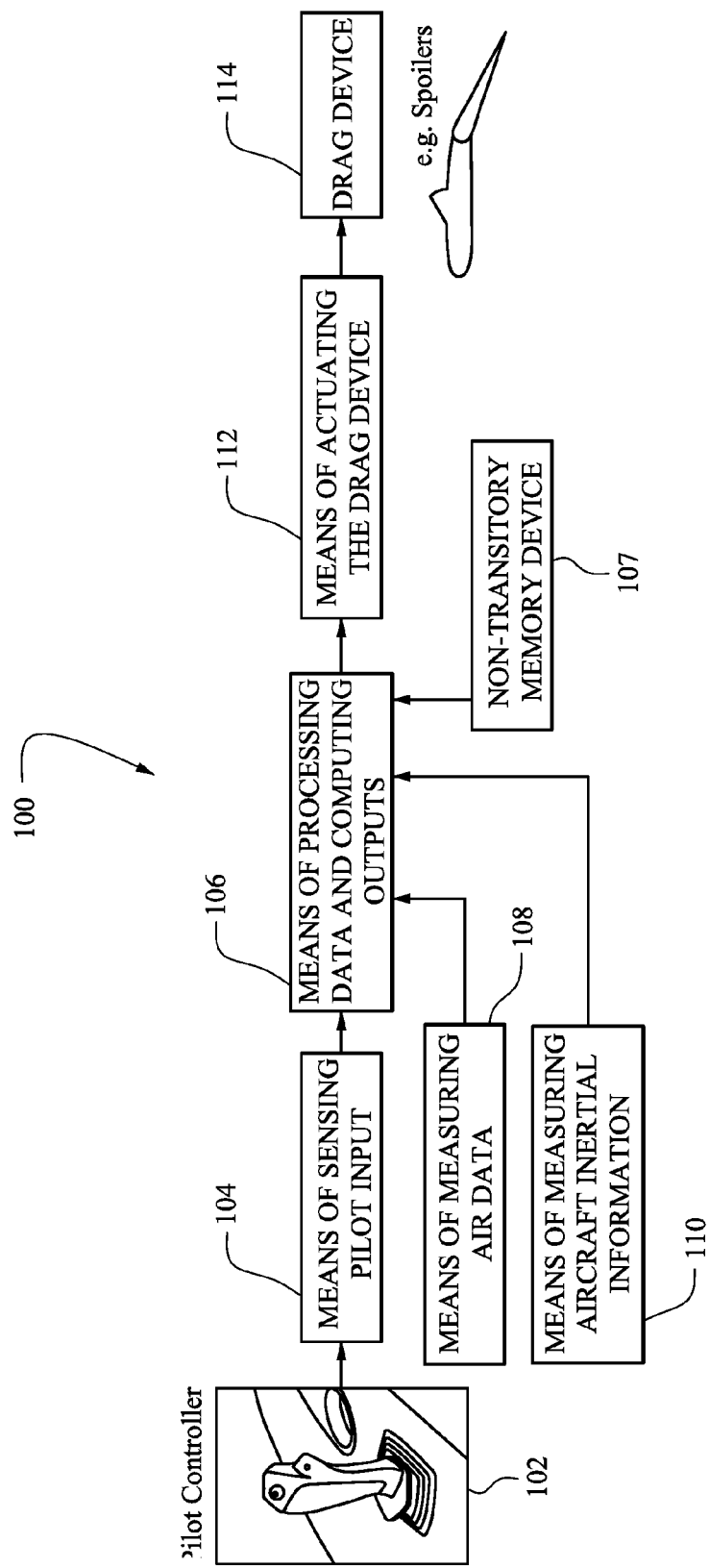
FIG. 2 shows an example non-limiting system for providing steep approach performance optimization.

The FIG. 2 example non-limiting system and method may optimize the drag device positioning used to perform the Steep Approach to improve its performance. In this example non-limiting embodiment, means 104 of sensing pilot input is connected to a pilot input device such as an inceptor 102. A means (e.g., probes) 108 of measuring air data and a means (e.g., AHRS) 110 of measuring aircraft inertial information supply additional inputs to a means (e.g., Fly-By-Wire or avionics system) 106 to process data and computing outputs to command the drag devices 114. The means 106 can comprise a general purpose CPU coupled to a non-transitory memory means 107 storing program instructions that are executed by the processor, or could comprise other implementations such as programmed logic and/or a digital signal processor. These alternatives are all referred to herein as "processor." The means 106 provides control outputs to means (e.g., hydraulic or electromechanical actuators) 112 of actuating the drag devices. Means 112 is coupled to drag devices 114 such as spoilers.

Figure 3:
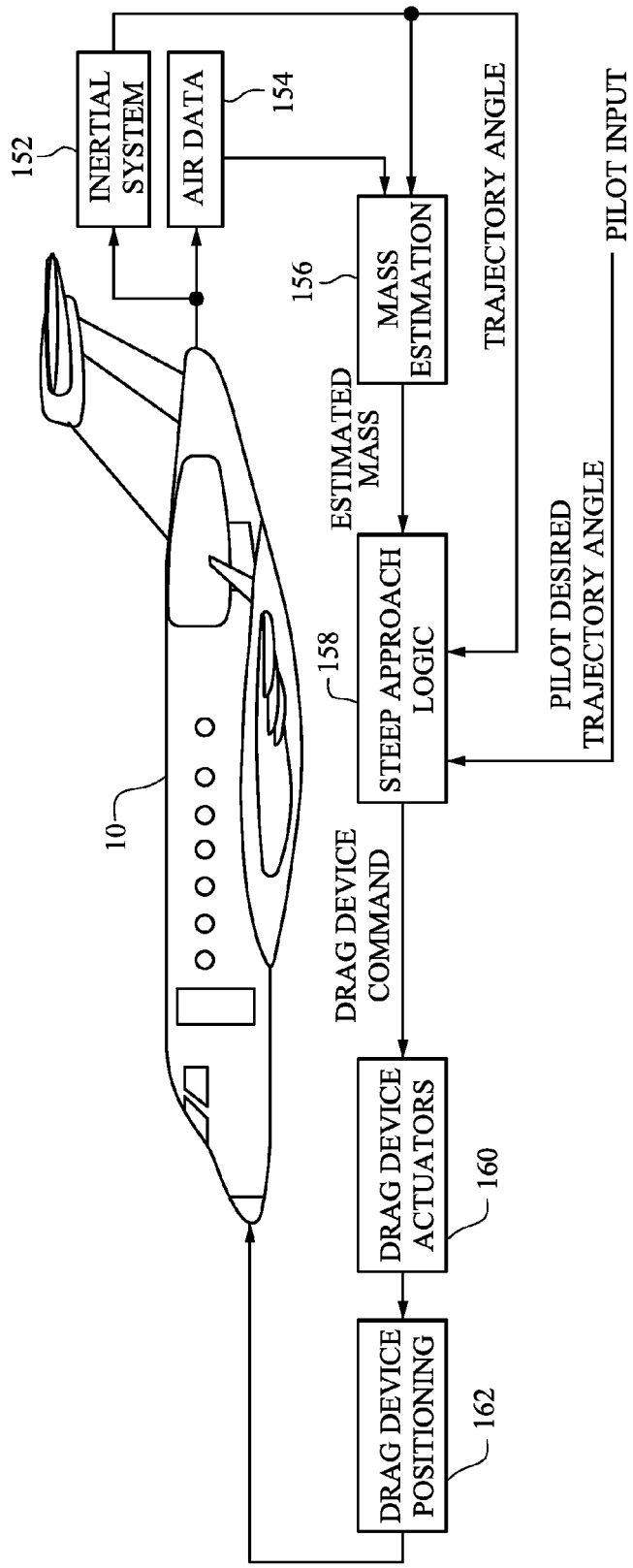
FIG. 3 shows a steep approach performance optimization process flow.

FIG. 3 shows a different schematic illustration of the means 106 to process data and computing outputs to command the drag devices 114. In this embodiment, the inertial navigation system 152 and air data sensor system 154 on board the aircraft 10 provide inputs to a mass estimator 156 that estimates the mass of the aircraft. Generally speaking, mass estimator 156 estimates the aircraft mass by determining the responsiveness of the aircraft to changes in control surface positions, using calculations based on F=ma. This mass estimation is applied to steep approach logic 158 which also receives trajectory angle from the inertial navigation system 150. The inertial navigation system 152 can determine current trajectory of the aircraft 10 based on for example a 3-axis gyroscope and/or other sensors. The steep approach logic 158 also receives pilot desired trajectory angle from a pilot input device such as inceptor 102. Based on these inputs, steep approach logic 158 develops a draft device command that it applies to drag device actuators 160 (see means 112 above) to accomplish drag device positioning 162.

Figure 4:
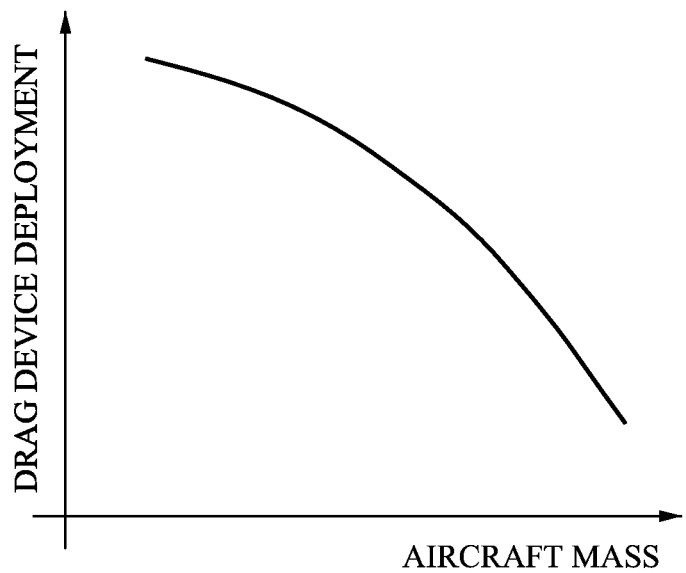
FIG. 4 depicts drag device modulation as a function of mass (this modulation avoids unnecessary increase in approach speeds for heavier configurations).

FIG. 4 shows an example control function performed by steep approach logic 158 to control drag device employment as a function of aircraft mass. FIG. 4 shows that as aircraft mass decreases, the amount of drag required from drag devices such as spoilers increases to have the same effect on aircraft trajectory.

Figure 5:
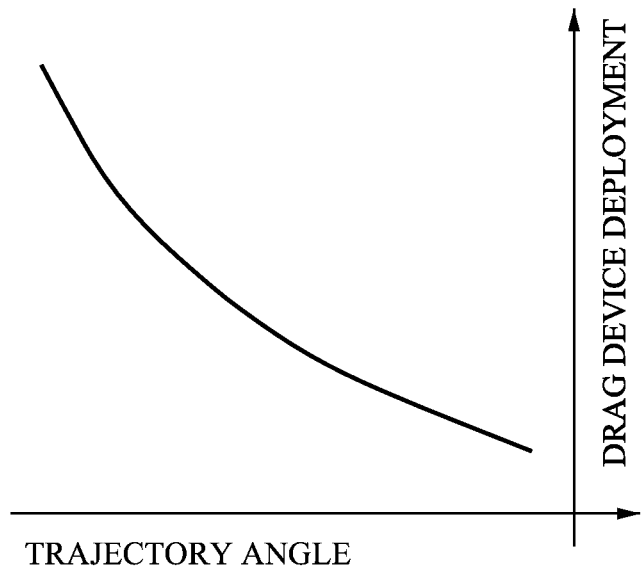
FIG. 5 depicts drag device modulation as a function of trajectory angle (the trajectory angle has negative values as in FIG. 1).

FIG. 5 shows an example control function based on trajectory angle. This Figure shows that as trajectory angle (which is negative and thus ranges from 0 to −x degrees) increases, drag device deployment must increase based on a non-linear function. Thus, a steeper approach trajectory will require much more drag from the spoilers.

Figure 6:
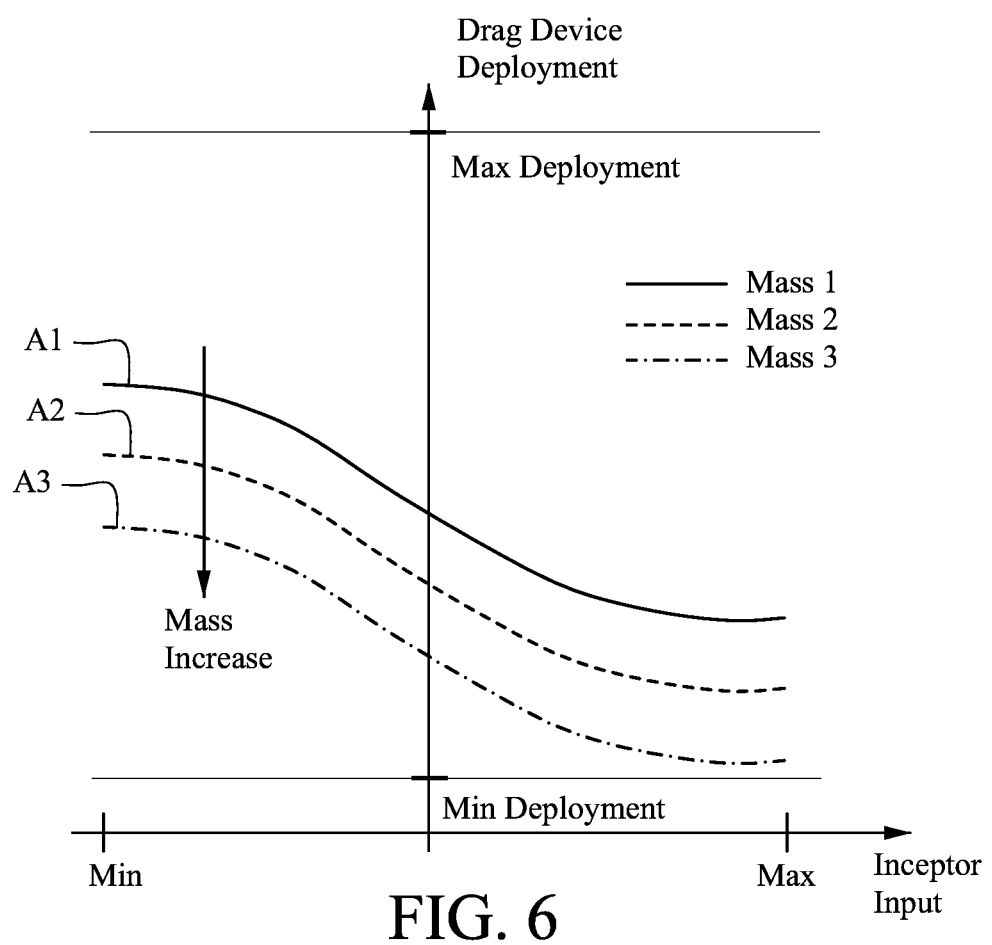
FIG. 6 depicts the drag device deployment as a function of aircraft mass and inceptor input for a normal steep approach glide slope.

FIG. 6 depicts example non-limiting drag device deployment as a function of aircraft mass and inceptor input for a normal steep approach glide slope. This FIG. 6 shows curves A1, A2, A3 (a family of curves) which correspond, for the purpose of illustrating a non-limiting implementation, to three values of aircraft mass (Mass 1, Mass 2, Mass 3). If the aircraft mass is initially at "Mass 3" and decreases during flight (e.g., based on fuel consumption), the necessary deployment of the drag devices increases. As the aircraft mass changes from Mass 3 to Mass 2 (where Mass 3>Mass 2), the drag device deployment smoothly transitions from the curve A3 (corresponding to Mass 3) to curve A2 (corresponding to Mass 2). The same behavior happens when the aircraft mass changes from Mass 2 to Mass 1 (where Mass 2>Mass 1), the drag device deployment smoothly transitions from the curve A2 curve A1 (corresponding to Mass 1). Of course, these three curves A1, A2, A3 are examples—the actual amount of drag device deployment can be calculated and/or derived from a lookup table in extremely fine gradations corresponding to the precise mass estimated by mass estimator 156.

Figure 7:
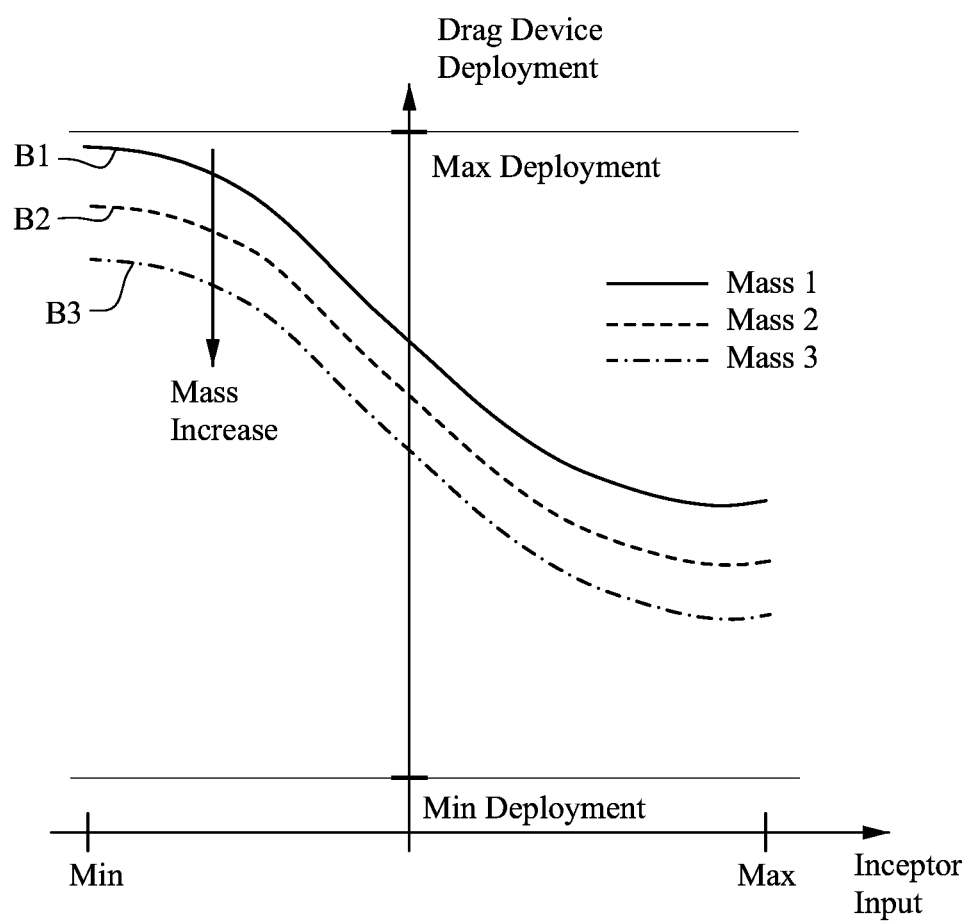
FIG. 7 shows drag device deployment as a function of mass and inceptor input for an abusive steep approach glide slope.

To fly an abusive steep approach, it is necessary to provide a higher drag device deployment as depicted in FIG. 7 referred to from now on as "Curve B" (actually a family of curves B1, B2, B3 for three example aircraft mass values) which comprises, for purposes of non-limiting illustration, three values of mass. If the aircraft mass is initially equal to "Mass 3", as the aircraft mass decreases, the necessary deployment of the drag devices increases. As the aircraft mass changes from Mass 3 to Mass 2 (where Mass 3>Mass 2), the drag device deployment smoothly transitions from the Curve B3 (corresponding to Mass 3) to curve B2 (corresponding to Mass 2). The same behavior happens when the aircraft mass changes from Mass 2 to Mass 1 (where Mass 2>Mass 1); the drag deployment smoothly transitioning from the curve B2 to B1 (corresponding to mass 1). As above, a preferred control law will provide much higher resolution to calculate and/or look up particular drag deployment values and provide more curves in the family of curves based on precise estimation of mass.

Figure 8:
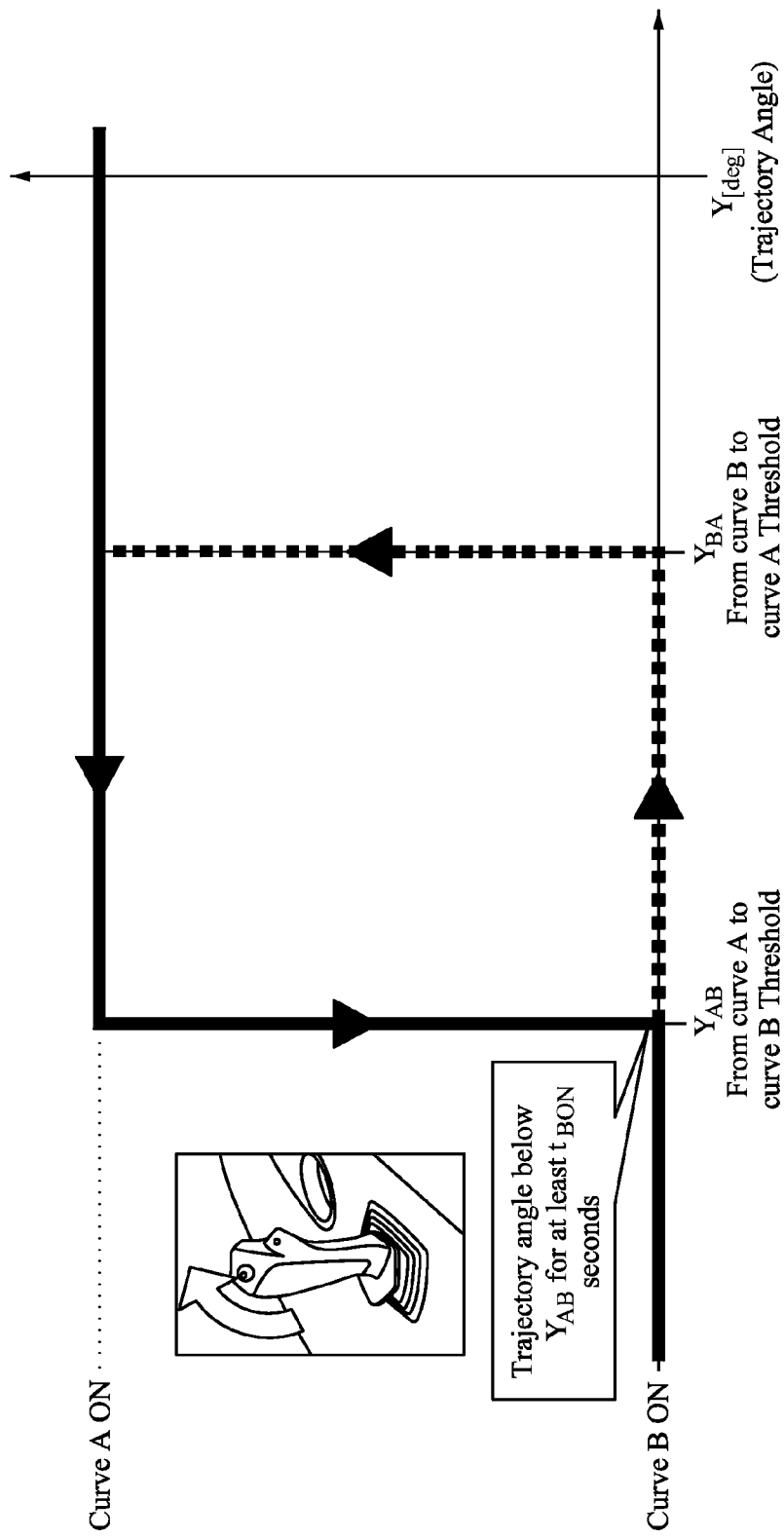
FIG. 8 depicts a drag device deployment curve that will provide a smooth transition from FIG. 6 Curve A2 to FIG. 7 Curve B2 (the trajectory angle has negative values as in FIG. 1).

To fly the abusive steep approach, it is desirable to use a higher drag device deployment as depicted in FIG. 7. Assume the aircraft is flying according to Curve A2—(with a Mass equal to Mass 2 and according to a normal glide slope—see FIG. 6), then transitions from the curve A2 to curve B2 (with a value of mass equal "2" and according to abusive steep approach—see FIG. 7). To accomplish this transition the pilot applies a command to keep the value of the trajectory angle below the value γAB for tBON seconds—see FIG. 8. Then, the drag device deployment curve will smoothly transition from Curve A2 to Curve B2. This logic is depicted in FIG. 8.

When flying according to Curve B (for an abusive steep approach), the drag devices are modulated according to a given value of aircraft mass, the current angle of the trajectory and the pilot longitudinal inceptor input.

In this case, as the aircraft mass changes from Mass 2 to Mass 1, the drag device deployment smoothly transitions from the Curve B2 (corresponding to Mass 2) to B1 (corresponding to Mass 1)—see FIG. 7.

Figure 9:
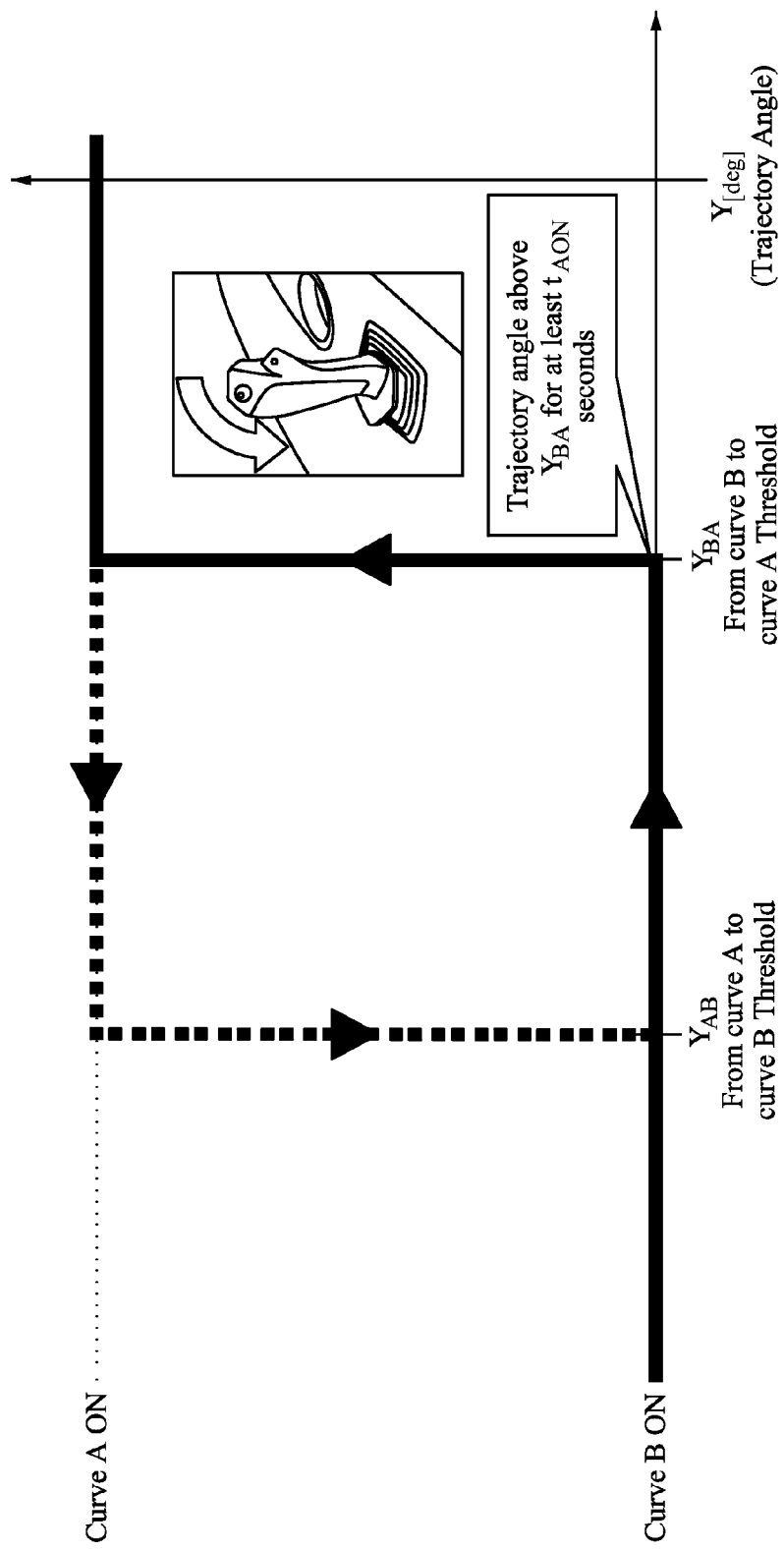
FIG. 9 depicts an example drag device deployment curve which will smoothly transition from FIG. 7 Curve B to FIG. 6 Curve A (the trajectory angle has negative values as in FIG. 1).

When returning to fly in the normal steep approach, the pilot applies a command to keep the trajectory angle above γBA for $t_{AON}$ seconds—see FIG. 9. Then, the drag device deployment curve will smoothly transition from Curve B to Curve A.

While the invention has been described in connection with what is presently considered to be the most practical and preferred embodiments, it is to be understood that the invention is not to be limited to the disclosed embodiments, but on the contrary, is intended to cover various modifications and equivalent arrangements.

The invention claimed is:

1. An automatic control system receiving sensed inertial information representing at least aircraft trajectory, sensed air information representing at least air speed and a control input representing pilot inceptor position and/or movement, the system comprising at least one processor coupled to a non-transitory memory device storing instructions, the at least one processor executing the stored instructions for controlling at least one drag control surface to provide steep approach glide slope of an aircraft, the at least one processor providing:

defining a function of drag device deployment to provide steep approach glide slope as a function of aircraft mass and at least one of trajectory angle and pilot inceptor position and/or movement, including defining at least first and second families of drag control surface deployment curves, the first and second families of curves each providing an increase in the amount of drag required from the at least one drag control surface as aircraft mass decreases, the second family of curves corresponding to a steeper approach glide slope as compared to the approach glide slope the first family of curves provides, the second family of drag device deployment curves providing, for a given aircraft mass and trajectory angle and/or pilot inceptor position and/or movement, a drag control surface deployment that is higher than the drag control surface deployment provided by the first family of curves;

transitioning between using the first family of curves and the second family of curves as a control law to control the at least one drag control surface in response to at least one of the trajectory angle and the pilot inceptor position and/or movement changes; and actuating the at least one drag control surface.

2. The system of claim 1 wherein the processor activates the first family of curves based on the trajectory angle exceeding a predetermined threshold for at least a predetermined time period, and activates the second family of curves based on the trajectory angle not exceeding a predetermined threshold for at least a predetermined time period.

3. The system of claim 1 further including a mass estimator that estimates aircraft mass based on the inertial information and the air speed.

4. The system of claim 1 further including a drag device actuator.

5. The system of claim 1 further including at least one inertial sensor that senses the trajectory of the aircraft.

6. The system of claim 1 further including an air speed sensor.

7. An automatic control system for controlling at least one drag control surface to provide steep approach trajectory, the system comprising:
  means for measuring air data;
  means for measuring aircraft inertial information;
  means for sensing pilot input; means, coupled to the air data measuring means, the aircraft inertial information measuring means and the pilot input sensing means, for processing data and computing outputs to command the drag devices, including defining at least first and second families of drag control surface deployment curves, the first and second families of curves each providing an increase in the amount of drag required from the at least one drag control surface as aircraft mass decreases, the second family of curves corresponding to a steeper approach glide slope as compared to the approach glide slope the first family of curves provides, the second family of drag device deployment curves providing, for a given aircraft mass and trajectory angle and/or pilot inceptor position and/or movement, a drag control surface deployment that is higher than the drag control surface deployment provided by the first family of curves, the processing means transitioning between using the first family of curves and the second family of curves as a control law to control the at least one drag control surface in response to at least one of the trajectory angle and the pilot inceptor position and/or movement changes; and
  means coupled to the processing means for actuating the at least one drag control surface.

8. An automatic control method for controlling at least one drag control surface provide steep approach trajectory, the method comprising:
  measuring air data;
  measuring aircraft inertial information;
  sensing pilot input;
  using at least one processor, processing data and computing outputs to command the drag devices including defining at least first and second families of drag control surface deployment curves, the first and second families of curves each providing an increase in the amount of drag required from the at least one drag control surface as aircraft mass decreases, the second family of curves corresponding to a steeper approach glide slope as compared to the approach glide slope the first family of curves provides, the second family of drag device deployment curves providing, for a given aircraft mass and trajectory angle and/or pilot inceptor position and/or movement, a drag control surface deployment that is higher than the drag control surface deployment provided by the first family of curves, and transitioning between using the first family of curves and the second family of curves as a control law to control the at least one drag control surface in response to at least one of the trajectory angle and the pilot inceptor position and/or movement changes; and
  actuating the at least one drag control surface.

9. The method of claim 8 wherein the processor activates the first family of curves based on the trajectory exceeding a predetermined threshold for at least a predetermined time period, and activates the second family of curves based on the trajectory not exceeding a predetermined threshold for at least a predetermined time period.

10. The method of claim 8 further including estimating mass based on the inertial information and air data, and using the estimated mass to command the at least one drag control surface.

* * * * *